Oct. 23, 1923.
G. B. COOLIDGE
1,471,883
AUTOMATIC STEERING ATTACHMENT FOR MOTOR VEHICLES
Filed May 23, 1921
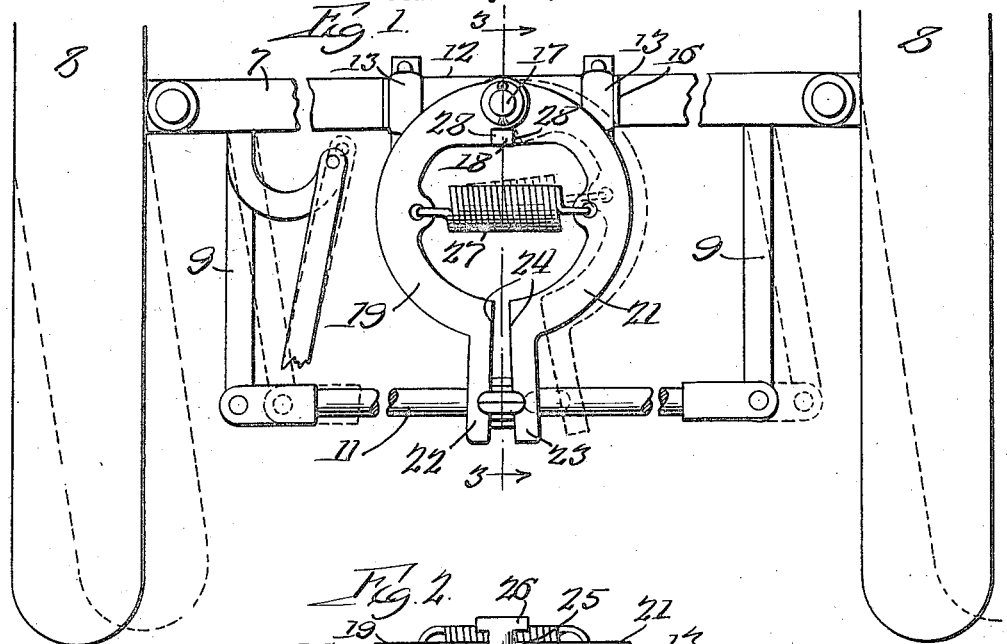
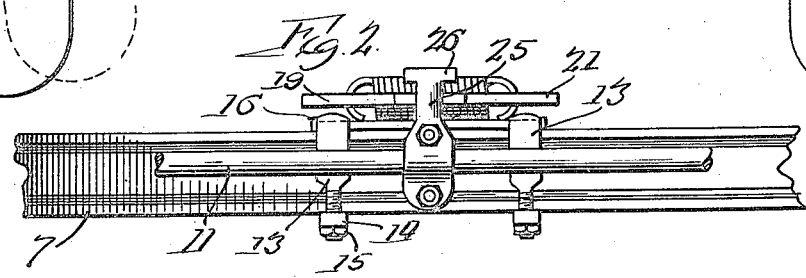
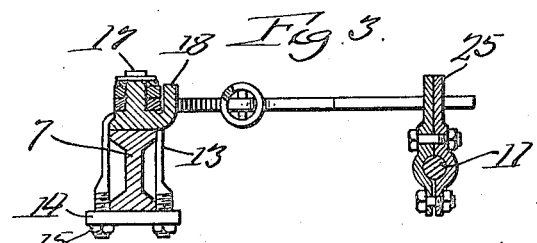
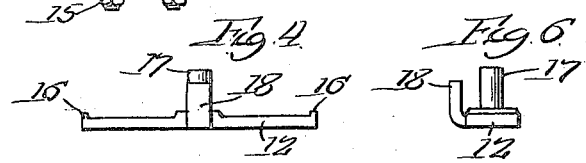
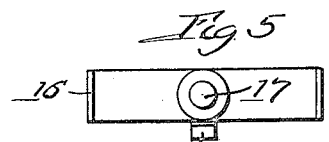
Inventor:
George B. Coolidge
By Ira J. Wilson
Atty.

Patented Oct. 23, 1923.

1,471,883

UNITED STATES PATENT OFFICE.

GEORGE B. COOLIDGE, OF ROCKFORD, ILLINOIS.

AUTOMATIC STEERING ATTACHMENT FOR MOTOR VEHICLES.

Application filed May 23, 1921. Serial No. 471,755.

*To all whom it may concern:*

Be it known that I, GEORGE B. COOLIDGE, a citizen of the United States, residing at Rockford, in the county of Winnebago and State of Illinois, have invented certain new and useful Improvements in Automatic Steering Attachments for Motor Vehicles, of which the following is a specification.

This invention pertains in general to steering mechanism for motor vehicles, and the primary object is to provide an attachment adapted to be applied to any motor vehicle and especially to Fords for automatically holding the steering wheels in a straight-ahead position.

Another object is to provide an attachment of the character described, which shall eliminate jerking and vibration of steering wheels caused by running over stones, rough roads or other obstructions, and which will generally improve steering conditions in a car.

I have also aimed to provide a steering attachment so designed and constructed that it will be practical and durable for the purposes intended and will be capable of production at a comparatively low cost.

Other objects and attendant advantages will be appreciated by those familiar with this art as the invention becomes better understood by reference to the following description when considered in connection with the accompanying drawings, in which—

Figure 1 is a top view of a steering attachment embodying my invention, applied to a motor vehicle;

Fig. 2, a front view of the steering attachment and certain parts shown in Fig. 1;

Fig. 3, a vertical sectional view taken on the line 3—3 of Fig. 1; and

Figs. 4, 5 and 6, front, top and end views respectively, of one of the brackets forming a part of the attachment.

Referring now more particularly to Fig. 1, I have shown somewhat diagrammatically a front axle 7 of a motor vehicle, pivot steering wheels 8, and rearwardly extending steering knuckle levers 9 joined at their rear ends by the connecting rod 11.

My improvements consist of a bracket 12 adapted to seat on the top of the axle 7 and be clamped thereto by U-shaped bolts 13 equipped with the usual cross bars 14 and nuts 15. The top of the bracket 12 is shaped to provide raised end portions 16 which prevent outward displacement of the U-bolts from the bracket. This bracket has formed integral therewith, an upstanding pin 17 and spaced substantially therefrom an upstanding lug 18. Pivotally mounted on the pin 17 is a pair of lobster jaw levers 19 and 21 having elongated ends 22 and 23 respectively, the adjacent edges 24 of which converge forwardly as shown plainly in Fig. 1. An upstanding lug 25 bolted to the connecting rod 11 is disposed between the ends 22 and 23 and has a T-shaped head 26, whereby to prevent said ends from moving upwardly away from the lug. A coil spring 27 interposed between and connected medially to the levers 19 and 21 constantly urges their rear ends against the lug 25. In the normal position shown in Fig. 1, that is, with the wheels straight ahead the pressure of the spring 27 will be applied through said levers, to the lug 25, but in the event that the wheels are turned in either direction one or the other of said lobster jaw levers will be held against movement in such direction by reason of its contact with the lug 18. In this regard, it will be noted that each of said levers has an abutment 28 adapted by contact with the lug 18, to stop pivotal movement in one direction. It follows from the foregoing that when the wheels are turned to the left as indicated in dotted lines in Fig. 1, the lever 19 will remain in the full line position shown, while the lever 21 will be swung to the dotted line position against the pressure of the spring 27. This spring pressure will be utilized in returning the wheels to the normal straight-ahead position. In other words, the spring 27 functions to automatically maintain the wheels in the straight-ahead position and to assist in returning them to such position after turning. It will now be noted that by reason of the particular arrangement of the spring 27, its pressure is not increased directly in proportion to the linear travel of the stud 25, but that due to the arc through which the ends of the spring travel by reason of their connection with the levers 19 and 21, there is a reduction in the spring pressure ratio. This makes steering easier as the spring pressure does not increase to the same extent when making a sharp turn as it would in the event that the spring pressure increased in direct proportion to the turning movement. On the other hand, the full effect of the spring is utilized in maintaining the wheels in the straight-ahead position. The parts as shown herein are simple in construction and capable of production at a comparatively low cost. They may be applied to practically any motor vehicle and are especially adapted for Ford motor cars.

It will be observed that by casting the pivot pin 17 and the lug 18 integral with the bracket 12, the cost of production is materially lowered; and furthermore by attaching the levers 19 and 21 to an integral pivot pin, such as 17, and providing a bearing washer on the upper end of said pivot pin held in position by a cotter pin for thus preventing displacement of the levers, there is no danger of the pivot pin working loose or the levers being displaced as a result of vibration. It will also be noted that by casting a single upstanding stop lug 18 integral with the bracket 12, the levers 19 and 21 may be made flat, thus simplifying the construction and reducing the cost of production. Another feature promoting low cost of production is the casting of the lug 25 in two duplicate parts, that is, from the same pattern, which also facilitates assembling.

It is believed that the foregoing conveys a clear understanding of the objects prefaced above, and while I have illustrated but a single working embodiment of my invention, it should be understood that various changes might be made in details of construction without departing from the spirit and scope of the invention as expressed in the appended claim.

I claim:

An automatic steering attachment for motor vehicles comprising in combination with the axle and steering wheel connecting rod, a bracket shaped to seat on the axle and having cast integrally therewith an upstanding pivot pin and upstanding stop lug, a pair of levers each pivoted at one end of said pivot pin one above the other in the horizontal plane of said stop lug, each lever being recessed for the reception of said lug and one wall of each recess abutting against said lug for limiting inward movement of its lever, a contractile spring for drawing said levers together against said lug and opposing outward movement of the respective levers, means on the upper end of the pivot pin for preventing displacement of the levers, the rear end of each lever having an elongated inner face, an upstanding lug on the connecting rod comprising two duplicate half sections adapted to be clamped against the front and back of said rod, and a bolt above and another below said rod connecting said lug sections together and clamping them to the rod, said lug sections being disposed centrally between said inner lever faces on a centerline passing through the center of said upstanding lug and pivot pin on the bracket.

GEORGE B. COOLIDGE.